United States Patent Office 3,318,032
Patented May 9, 1967

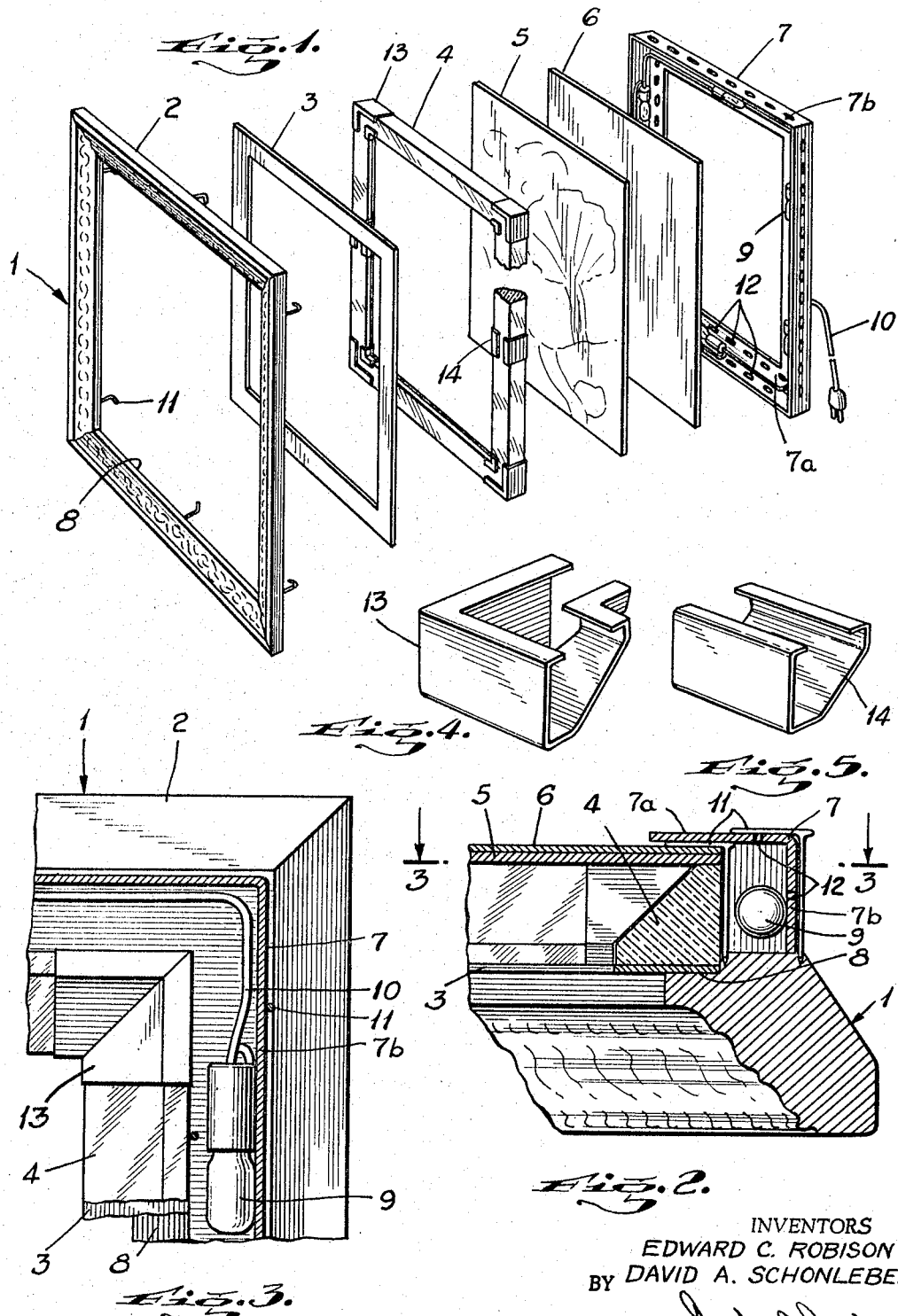

3,318,032
ILLUMINATED DISPLAY FRAME
Edward C. Robison, 9302 Molokai Drive, and David A. Schonleber, 22071 Malibu Lane, both of Huntington Beach, Calif. 92646
Filed Aug. 12, 1965, Ser. No. 479,100
4 Claims. (Cl. 40—152.2)

This invention relates to picture frames, and more particularly to illumination of pictures, boards and similar, by a light source which is concealed from the direct viewer of the picture.

Basically, the presently known and used types of picture frames are either furnished with an exteriorly located lamp hanging over the picture or lamps incorporated within the outer frame or attached to the outer frame. Such frames have certain drawbacks; the type equipped with an overhanging lamp is cumbersome and difficult to pack and ship, unless the lamp has been removed prior thereto; as to the type of picture frames, where the light source is placed within or attached to the front of the frame itself, especially designed frames must be made for that purpose, or an additional frame section must be added to an already existing frame. In the latter case, the intended design of an already existing frame is thereby changed, and this presents an obvious disadvantage, particularly, where one wishes to illuminate antique, hand carved or otherwise expensive picture frames.

A principal object of the invention is to provide illuminating means for any already existing picture without thereby changing the external appearance of the frame or attaching an overhanging cumbersome lamp thereto, in that translucent lists, for example, made of plexiglass or similar are mounted between the inner edge of the picture frame and the picture, extending completely around the edges of the latter, and in that the light source is positioned adjacent and alongside the outer sides of said translucent lists, transmitting light through the latter, to the picture surface.

A further object of the invention is to accomplish a uniform distribution of light over the entire picture surface, without having to use elongated bulbs extending completely around the picture frame, in that there is used light diffusing prismatic translucent lists, for example, made of plexiglass, extending around the entire periphery of the frame, causing the light emitted from fewer light sources, disposed adjacent said translucent lists, to be dispersed evenly over the entire picture front surface.

A still further object of the invention is to provide standardized illuminating means for picture frames, which easily and inexpensively can be mounted on and removed from any existing or new frames, thereby using a minimum of fastening means, such as screws, cleats, or similar, in that the light source and light diffusing means are securely held together by and incorporated into a unit by mounting ribs along the edges of a backing board, mounted on the back of the picture, having flanges which extend curviformed downwardly therefrom to the back of the outer frame, at which place said flanges are fastened by appropriate means. Thus, it would no longer be necessary to bore any holes in the front of the outer frame or to cut away any parts of an existing frame in order to mount illuminating means thereon.

Various other objects and advantages will appear from the following description of one embodiment of the invention and the novel features will be particularly pointed out hereinafter in connection with the appended claims.

In the drawings:

FIGURE 1 is a perspective view of the elements of the illuminated frame before being assembled.

FIGURE 2 is an enlarged sectional perspective view of the frame assembly.

FIGURE 3 is a sectional view on line 3—3 of FIGURE 2 showing a corner section of the frame assembly.

FIGURE 4 is an enlarged perspective view of a corner sleeve, employed in the assembly of FIGURE 1.

FIGURE 5 is another enlarged perspective view of an extension sleeve, likewise used in the assembly of the frame.

Referring now to the drawings, and more particularly to FIGURE 1, wherein like reference symbols indicate the same parts throughout the various views, 1 refers generally to the frame assembly of this invention, which comprises an outer frame 2, an insert 3, light diffusing prismatic lists 4, a picture or bulletin board 5 to be displayed in said outer frame, a backing board 6, and a housing 7, containing light sources for illumination of the picture.

When mounting the elements of the assembly 1, the insert 3 will rest on the recess 8, extending completely around the inner edge of the outer frame 2. The light diffusing translucent lists, the width of which substantially corresponds to that of insert 3, to conceal a direct view of the former from the outside, are then placed on top of insert 3 and fastened thereto and to the outer frame 2 by any suitable means, such as cleats, nails 11, etc. The translucent lists 4, when mounted on the insert 3 in the recess 8, project heightwise from and above the interiorly extending top plane of the back side of the outer frame 2, and its side facing said insert, partly, rests directly on the latter and partly form an angle therewith, preferably below 90 degrees. The picture 5 or board to be displayed within the outer frame 2 is then mounted on the translucent lists 4, and the backing board 6 is placed on top of picture 5. The backing board 6 may also be an integral part of picture 5, particularly when the frame assembly 1 is used for illuminating a painting on canvas, which is already arranged on a stretcher. The housing or light box 7 consists of ribs 7a and flanges 7b, the latter extending downwardly and preferably oblique outwardly from the ribs 7a. The width of the flanges 7b corresponds substantially to the combined width of insert 3, lists 4, picture 5, and backing 6. When all the elements of the frame assembly 1 have been assembled, the ribs 7a will lie on the outer edges of the back side of the backing 6, the flanges 7b, which extend downwardly therefrom to the back of the outer frame 2, are fastened to the latter by any appropriate means, such as cleats, screws 11 etc., thusly securing that all elements of the frame assembly is held in place.

The housing or light box 7, extending from the backing 6 down to the back of the outer frame, will thus incorporate and interlock the elements of the assembly, namely 3, 4, 5 and 6. As stated above the flanges 7b extend oblique outwardly from the ribs 7a, preferably in a curved fashion in order to provide sufficient space for the light source 9, 10, shown as an ordinary electric bulb with socket and wiring. Obviously, the lighting means may be powered by any suitable source, for example, battery. The bulbs 9 are arranged along the inner walls of the flanges 7b and are—when all the elements of the illuminated frame have been assembled—positioned substantially in height with and adjacent the translucent lists 4, which will transmit and disperse the light coming from the light source evenly over the entire front surface of the displayed picture. In order to obtain a maximum lighting effect the front edges of the translucent lists 4, mounted on the insert 3, should, as stated above, form an angle of less than 90 degrees with the latter.

Proceeding to FIGURE 2, there is shown a sectional perspective view of the frame assembly 1, clearly indicating the interrelation of the various elements of the assembly, particularly the positions of the bulbs relative to the translucent lists. There are also shown fastening means, for example, cleats 11, for the housing 7 and backing board 6.

FIGURE 3 shows another sectional view of the assembly. The flanges 7b are provided with holes or slots 12 so that air may freely circulate within the frame assembly, preventing any overheating of the picture or other elements of the assembly, arising from the heat generated by the light source 9.

FIGURE 4 shows an example of corner sleeves, intended to be attached to the respective ends of the translucent lists so as to form the corners of the translucent frame, as indicated at 13 of FIGURE 1. These corner sleeves may prove to be of great advantage, when such translucent lists 4 are mass-produced in straight lists and then cut to size for individual needs.

FIGURE 5 shows an extension sleeve, connecting two lengths of lists, as indicated at 14 of FIGURE 1. Such extension sleeves 14 will prove most advantageous, particularly where large surfaces are to be illuminated and therefore long translucent lists are needed for this purpose.

Similar corner sleeves and extension sleeves could be attached to the housing part 7 for the same purpose as stated above.

It will be understood, that this invention is susceptible to modifications in order to adapt it to different usages and conditions, and, accordingly, it is desired to comprehend such modifications within this invention as may fall within the scope of the appended claims.

We claim:
1. An illuminated display frame, comprising an outer polygonal frame having a recess extending completely around its interior edges;
   a rectangular insert positioned on, and protruding beyond the periphery of said recess;
   a plurality of prismatic translucent lists mounted on top of and extending completely along the edges of said insert, the width of said translucent lists corresponding substantially to that of said insert, so as to prevent a direct view of said translucent lists from the front of said outer frame, said translucent lists protruding upwardly beyond said recess and the back of said outer frame, forming elevated edges, which extend continuously along the interior edge of said outer frame;
   a picture mounted on and within the outer elevated edges of said translucent lists;
   a plurality of fastening means securing said insert, translucent lists and picture to the back of said outer frame;
   a backing base mounted on the back of said picture;
   a plurality of ribs mounted on top of and along the edges of said backing base;
   a plurality of flanges extending downwardly and oblique outwardly from said ribs to the back of said outer frame, so as to form a housing therewith;
   a plurality of light sources mounted on the inner sides of said flanges, alongside with and adjacent the outer projecting elevated sides of said translucent lists, so as to transmit light through the latter to the front surface of said picture, thereby illuminating the same;
   a plurality of fastening means to secure the attachment of said flanges to the back side of said outer frame so as to interlock said backing base, picture, translucent lists, insert and outer frame;

2. An illuminated display frame, as recited in claim 1, including the following additional elements:
   four corner sleeves each of which is right angularly connecting two ends of said translucent lists, so as to form a rectangle of said translucent lists.

3. An illuminated display frame, as recited in claim 2, wherein said translucent lists preferably form an angle of less than 90 degrees with said insert.

4. An illuminated display frame, as recited in claim 1, wherein said flanges, constituting together with said ribs a housing for said light source, are provided with apertures to allow air to freely circulate therein so as to prevent overheating of said picture and outer frame.

References Cited by the Examiner

UNITED STATES PATENTS

| | | | |
|---|---|---|---|
| 947,127 | 1/1910 | Roberts | 40—152 X |
| 2,128,245 | 8/1938 | Hardesty | 40—130 |
| 2,140,972 | 12/1938 | Tylsky | 40—130 |
| 2,677,909 | 5/1964 | Heydenryk | 40—152.2 |

EUGENE R. CAPOZIO, *Primary Examiner.*

W. J. CONTRERAS, *Assistant Examiner.*